(12) United States Patent
Kerpez

(10) Patent No.: US 7,106,833 B2
(45) Date of Patent: Sep. 12, 2006

(54) AUTOMATED SYSTEM AND METHOD FOR MANAGEMENT OF DIGITAL SUBSCRIBER LINES

(75) Inventor: Kenneth Kerpez, Long Valley, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 685 days.

(21) Appl. No.: 10/400,354

(22) Filed: Mar. 27, 2003

(65) Prior Publication Data

US 2004/0095921 A1   May 20, 2004

Related U.S. Application Data

(60) Provisional application No. 60/427,262, filed on Nov. 19, 2002.

(51) Int. Cl.
H04M 1/24 (2006.01)
H04M 3/08 (2006.01)
H04M 3/22 (2006.01)

(52) U.S. Cl. .................. 379/1.03; 379/27.01; 379/416; 379/417; 370/201; 375/296

(58) Field of Classification Search ............... 379/1.01, 379/1.03, 1.04, 10.01, 12, 22, 22.03, 22.04, 379/22.08, 24, 27.1, 29.01, 416–417; 370/351–352, 370/201; 375/296
See application file for complete search history.

(56) References Cited

U.S. PATENT DOCUMENTS

| 5,991,271 | A | 11/1999 | Jones et al. | 370/252 |
| 6,128,348 | A | 10/2000 | Kao et al. | 375/260 |
| 6,229,855 | B1 | 5/2001 | Takatori et al. | 375/296 |
| 6,292,559 | B1 * | 9/2001 | Gaikwad et al. | 379/417 |
| 6,317,495 | B1 * | 11/2001 | Gaikwad et al. | 379/417 |
| 6,636,603 | B1 | 10/2003 | Milbrandt | 379/399.01 |
| 6,839,429 | B1 * | 1/2005 | Gaikwad et al. | 379/417 |
| 6,870,901 | B1 * | 3/2005 | Gudmundsson et al. | 379/22 |
| 6,970,560 | B1 * | 11/2005 | Hench et al. | 379/417 |

(Continued)

OTHER PUBLICATIONS

American National Standard Institute T1.417 issue 2, "Spectrum Management for Loop Transmission Systems," T1E1.4/2001-002R3, Feb. 18, 2002.

(Continued)

Primary Examiner—Binh K. Tieu
(74) Attorney, Agent, or Firm—William A. Schoneman; Joseph Giordano (57) ABSTRACT

An automatic system for the provisioning, deployment and management of digital subscriber lines (DSL) in a telephone network uses data on loop composition, electromagnetic interference and crosstalk between lines to optimize the performance and correct problems with one or more symmetric and or asymmetric digital subscriber lines in a cable. The system optimizes DSL lines on an individual basis using measurements and data. The optimal transmit power spectral density (PSD) for each DSL can be found in an iterative manner. Starting each DSL with some predetermined starting parameter, the transmit PSD of each DSL is optimized in round-robin fashion. The crosstalk into a given DSL is calculated as the power sum of all transmissions passed through their measured crosstalk couplings. An asymmetric DSL has its transmit PSD optimized by using the "water-filling" technique. A symmetric or single carrier DSL has its transmit PSD optimized simply as being the PSD corresponding to the maximum bit rate that it can reliably transmit. The joint optimization algorithm converges rapidly to unique values after only a few iterations. Each DSL may also be analyzed by the DSL management system to correct for crosstalk disturbers and electromagnetic interference (EMI) on an individual basis.

22 Claims, 8 Drawing Sheets

U.S. PATENT DOCUMENTS

2005/0220180 A1* 10/2005 Barlev et al. ............... 375/222

OTHER PUBLICATIONS

K.B. Song, S.T. Chung, G. Ginis, and J.M. Cioffi, "Dynamic Spectrum Management for Next Generation DSL Systems," IEEE Communications Magazine, vol. 40, pp. 101-109, Oct. 2002.

Z. Litichever, et al., "Algorithms for Rate Selection in a Multi-Line System," A NSI T1E1.4/2002-072R1, pp. 1-7, Feb. 21, 2002.

W. Yu, et al, "Distributed Multiuser Power Control for Digital Subscriber Lines," IEEE Journal on Selected Area in Communications (JSAC), pp. 1105-1115, vol. 20, No. 5, Jun. 2002.

Prof. John Cioffi, "Standard Dynamic Spectrum Management Project," http://isl.stanford.edu/~cioffi/dsm/.

R. Blahut, *Principles and Practice of Information Theory*, Addison-Wesley, Reading, MA, 1987, ch. 7.6, pp. 264-269.

S. Galli, et al., "A Frequency-Domain Approach to Crosstalk Identification in xDSL Systems," IEEE Journal on Selected Areas in Communications (JSAC), pp. 1497-1506, vol. 19, No. 8, Aug. 2001.

C. Zeng, et al., "Crosstalk Identification in xDSL Systems," IEEE Journal on Selected Areas in Communications (JSAC), pp. 1488-1496, vol. 19, No. 8, Aug. 2001.

* cited by examiner

FIG. 8

AUTOMATED SYSTEM AND METHOD FOR MANAGEMENT OF DIGITAL SUBSCRIBER LINES

CROSS REFERENCE TO RELATED APPLICATION

This application claims the benefit of priority of U.S. provisional application No. 60/427,262 filed on Nov. 19, 2002, entitled "Jointly Optimizing DSL Spectra."

FIELD OF THE INVENTION

This invention is related to the provisioning, deploying, managing and maintenance of digital subscriber lines ("DSL") systems in a telephone networks and the automated maintenance and spectrum management of such DSL loops for the broadband communication of client subscribers within the network. More specifically, this invention provides a system and method for optimizing all DSL transmit spectra to lower crosstalk, while simultaneously maximizing the bandwidth of the received signals, including joint optimization of single-carrier DSL spectra (such as G.shdsl), and multicarrier DSL spectra (such as ADSL).

BACKGROUND

The mainstay of the local telephone company network is the local subscriber loop, i.e., the loop from a central office ("CO") to a subscriber. The local subscriber loop is now being used to provide broadband digital telecommunication services such as digital subscriber line ("DSL") service. Such broadband DSL services include integrated services digital subscriber network ("ISDN"), high-rate digital subscriber line ("HDSL"), asymmetrical digital subscriber lines ("ADSL") and very high rate digital subscriber lines ("VDSL") technology. DSL services allow residential and business customers to send and/or receive digital data at higher rates of speed than were previously possible using analog modem technology.

DSL technologies are engineered to operate over a class of subscriber loops, such as nonloaded loops (18 kft) or Carrier Serving Area (CSA) loops (9 to 12 kft). Digital Subscriber Line (DSL) technology exploits the existing, ubiquitous, copper telephone loop plant to provide megabit per second (Mbps) high-speed Internet access and other services. The great majority of residential customers and many business customers are served by such metallic (copper) twisted pair cables connected from a local switch in the central office ("CO") to the subscriber's landline telephones. For each subscriber, telephone and DSL signals travel on a twisted pair from a central office (CO) to the subscriber.

There are many impairments to DSL transmission including loop loss and crosstalk. DSL signals are attenuated and distorted by transmission through the loop, particularly at high frequencies and on loops with bridged tap. Some of the power of a DSL transmitting on a loop travels through a crosstalk-coupling path and generates crosstalk noise into other DSLs on loops in the same cable. Additionally, there is impairment from radio ingress and impulse noise, which is sometimes worse than the impairment from crosstalk. Electromagnetic interference (EMI) due to radio ingress appears as narrowband noise spikes in the frequency domain, and impulse noise occurs as brief spikes in the time domain. All these impairments vary in severity by tens of dB's from loop to loop.

Crosstalk generally increases with increasing frequency, and because DSL frequencies extend into the Megahertz ("MHz") range, crosstalk becomes the major limitation to high-speed ADSL. As time progresses it is expected that there will be many more ADSL users each demanding higher speed service. This will result in more crosstalk and higher-bandwidth services that are more vulnerable to crosstalk. Sources of crosstalk are often called "disturbers." There are two types of crosstalk: near-end crosstalk (NEXT) and far-end crosstalk (FEXT). NEXT is more powerful than FEXT, particularly below about 1 MHz where many DSLs use overlapping spectra. If there is one crosstalker, then the received crosstalk PSD is the product of a PSD transmitted on a nearby pair times the crosstalk coupling transfer function. With multiple crosstalkers the received crosstalk PSD is the power sum of each component.

If a DSL or other system transmits a power spectral density (PSD) on one pair of a multi-pair cable, then this PSD is multiplied by a crosstalk coupling function in the frequency domain, and the resulting crosstalk couples into a nearby pair. Spectral compatibility is the property that crosstalk between different systems that transmit in the same twisted-pair cable does not significantly degrade the performance of any of the systems. Spectrum management is the process of deploying DSLs in the loop plant in such a manner that ensures spectral compatibility. Current techniques for spectrum management apply rigid rules uniformly across the entire loop plant, as embodied in ANSI T1.417, the Spectrum Management Standard, developed by ANSI-accredited DSL standards committee T1E1.4. These rules do not take into account the individual types of crosstalk sources and crosstalk couplings of a particular cable, which may be considerably different than the near worst-case couplings that are assumed in the spectrum management standard.

DSL lines are typically maintained by using tests developed for POTS lines, which ignore frequencies above 4 kHz. DSL lines that fail because of the environment at high frequencies can sometimes be repaired by knowledgeable technicians with expensive manual tests, or the DSL service may simply be abandoned.

In typical current DSL provisioning the loop working length determines if a customer can get high rate service (~1.5 Mbps), low rate service (~400 kbps), or no service. Telephone loops vary considerably at high frequencies, with noise and crosstalk levels typically differing by 20 dB or more on different loops. The achievable bit rates that could be offered to customers are usually significantly higher than those currently provisioned. Moreover, some unexpected service failures are inevitable. DSL modems do self-adapt to their loop, for example by lowering the bit rate if need be. But this does not provide the DSL service provider much specific information or control.

DSL is a relatively new service from the local exchange carriers (LECs). Current practice assumes that there is little knowledge about a particular loop's transmission parameters except a rough estimate of loop length. All DSL services must withstand a statistical worst-case environment, assuming 99% worst-case crosstalk couplings that are only exceeded on 1% of cables, and binders filled with the worst-case types of crosstalkers. This conservative practice denies some customers DSL service that could have otherwise been provided such service (false negatives), in order to achieve a low number of expensive unexpected failures (false positives). However, it fails to completely eliminate false positives, since it does not account for the many different factors that can cause failures such as high levels of radio ingress or impulse noise. Worse, many DSLs are set to transmit higher power than necessary, creating unnecessarily high levels of crosstalk, instead of responding properly to the actual impairments on each particular loop.

Therefore, it would be desirable to have a system for using measurements of crosstalk, electromagnetic noise, background noise and loop make up to precisely determine DSL performance.

Furthermore, it would be desirable to have such a system for the automated identification and isolation of problems that result in degradation of the DSL performance.

Additionally, it would be desirable to implement these methods in a system that could efficiently provision, manage and maintain DSL service even before the installation of any DSL modems.

It would be desirable to provide a system that could automatically diagnose problems with DSL service once such DSL modems were installed.

It would be desirable to provide a system that could enable higher bit rates capable of supporting video transmission using current DSL technology.

Furthermore, it would be desirable to have a DSL management system that can identify potential problems with most DSL lines allowing DSL to be a carrier-grade service with solid service level agreement (SLA) guarantees.

Finally, it would be desirable to have a DSL management that automatically identifies the most costly and difficult to diagnose problems to provide remediation advice (i.e., remove bridged tap) before expending effort in the field.

SUMMARY

The present invention is a system and method for providing automated DSL service provisioning, deployment, management and maintenance in a telephone network. The present invention gathers electrical measurements of the loops and the crosstalk caused by other copper twisted pairs in the loop. The system incorporates a number of components, including automated loop identification, automated crosstalk identification and electromagnetic interference (EMI) identification, for use by automated processes that analyze a single DSL line and processes that simultaneously optimize multiple asymmetric and symmetric DSL lines. The present invention uses the actual crosstalk environment and crosstalk couplings between the individual DSLs in a particular cable. Rather than treat crosstalk as an unknown worst-case random noise, it is treated as the man-made interference that it is, to jointly optimize the reliability and bit rates of all DSLs.

Crosstalk may be measured by automated test, or by DSL modems themselves. Estimation of crosstalk power couplings may be made by measuring a single loop. This information can then be used to jointly optimize the transmission of all DSLs which crosstalk into one another simultaneously, and to assure spectrally compatibility on a case-by case-basis.

The present invention uses measurements of the loop, crosstalk couplings, and received noise on an individual basis. The measurements can identify pairs with crosstalk couplings that are well below worst case couplings and systems on these pairs may transmit at higher bit rate or over longer distances than current practice and the ANSI T1.417 spectrum management standard would dictate. Rather than use broad-brush DSL provisioning and spectrum management rules based on worst-case assumptions, the transmitted bit rates and powers of a number of DSLs transmitting in the same cable are coordinated by the invention, which receives multiple crosstalk measurements and processes them. The types and numbers of crosstalkers in a cable, or in an individual cable binder, can be measured, recorded and tracked. The invention allows DSL provisioning to provide the highest possible service rates while ensuring spectral compatibility. This invention can greatly increase the number of customers that can be served by DSL and the bit rates that they can receive. Loops that are identified to have low power-sum crosstalk could safely be provisioned to carry higher bit rates than current practice, which assumes high crosstalk levels.

DSL transmit PSDs are set to not only maximize the performance of the individual DSL, but also to simultaneously minimize the crosstalk that each causes in other DSLs. The present invention incorporates a method for optimizing symmetric DSL systems, such as G.shdsl, and asymmetric DSL systems, such as ADSL, or a combination thereof. The combination of the algorithms thus jointly optimizes both symmetric and asymmetric DSL services.

First, the system and method of the present invention determines the attenuation and distortion that would occur on a given line using data on loop make up. These inputs permit the precise calculation of the received DSL signal due to loop composition. Once this is known, data on the received crosstalk and EMI noise provide a means for determining the steady-state received noise. Knowledge of the received signal and noise as a function of frequency allows precise and unambiguous calculation of the DSL's steady-state performance. The method and system can then be used with varying inputs to analyze the impact of the constituent noise components for purposes of debugging the DSL line.

The method of the present invention for joint DSL spectral optimization uses round-robin iterative optimization, where each DSL optimizes its own spectra at each of several iterations in turn. These algorithms jointly optimize all symmetric DSL and asymmetric DSL transmissions to maximize the overall throughput in a cable. The optimal transmit PSDs can be found in an iterative fashion. All DSLs start with some typical starting parameters. Then the transmit PSD of each DSL is optimized in round-robin fashion. The crosstalk into a given DSL is calculated as the power sum of all transmissions passed through their measured crosstalk couplings. An asymmetric DSL has its transmit PSD optimized by using the "waterfilling" technique. A symmetric or single carrier DSL has its transmit PSD optimized simply as being the PSD corresponding to the maximum bit rate that it can reliably transmit. Then, the next DSL is optimized, then the next etc., and back to the first DSL, etc., until each DSL has been so optimized several times. This can be calculated off-line using crosstalk data that was measured or extracted from modems. Alternatively, the calculations can be done autonomously by the actual modems in service. The joint optimization algorithm converges rapidly to unique values after only a few iterations.

Each modem is assigned an overall transmit power level and then the bit rates are maximized. However, services are generally specified by the delivered bit rate, so a mechanism to assign or reshuffle the different transmit powers of each modem may be required to enable the specified bit rates for each DSL to be achieved. That is, while the optimum fine-grained spectra can be found autonomously, a centralized mechanism can assign overall parameters such as the average transmit power of each modem and start-up sequencing.

Using the system and method of the present invention the existing telephone network (loop plant) can be optimized to provide much higher bit rates, offering higher speeds, that in some cases will even support digital entertainment video, without installing new remote terminals or repeaters.

By measuring loop parameters and optimizing the spectra, increases of several hundred percent in average DSL bit rates can be achieved. These large increases in bit rate could also easily be traded for increased reliability, increased range, or some combination thereof. A combination of automated tests, storing properties of loops in a database, and analyzing this data to deploy and maintain DSL offers dramatic increases in DSL performance, and is a very compelling way to intelligently manage the telephone plant as it transitions to digital services.

The performance and reliability of a DSL system is determined solely by the ratio of received signal power to the received noise power. Knowledge of the loop composition and the loop response determines the received noise power.

The attenuation and distortion of a loop is readily calculated if the loop make up (including gauge types, bridged taps, and cable section lengths) is known. This then allows precise calculation of the received DSL signal. Then, if the received noise is known or measured as a function of frequency, the DSL's bit rate and performance level can be precisely and unambiguously calculated. This data can be gleaned from databases, measurements, and by querying DSL modems. Analyses can vary the loop make-up and noise components to determine their individual impact and debug the DSL line. This knowledge allows pinpoint precision in DSL provisioning, service assurance, and automated maintenance, avoiding many expensive unanticipated field failures.

DETAILED DESCRIPTION

Figure 1:
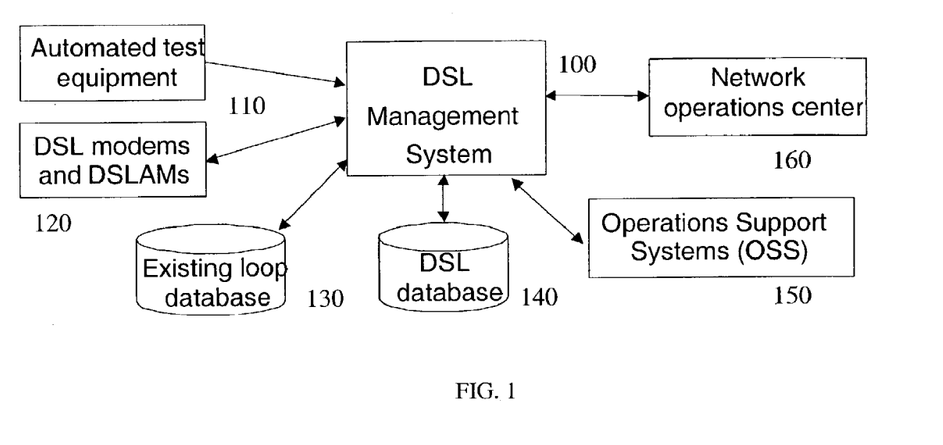
FIG. 1 is a schematic diagram depicting the infrastructure components of a DSL management system in accordance with the present invention.

FIG. 1 depicts a schematic diagram depicting the relationship of a DSL management system in accordance with the present invention with the components of existing telecommunications networks offering DSL service. DSL management system 100 uses information from automated test equipment 110 to receive information about the various loops that it is managing. DSL management system 100 is connected to one or more DSL modems and/or DSL access multipliers (DSLAMs) 120 through which DSL service is provided to subscribers. An existing loop database 130 provides the DSL management system with information regarding the existing network and loop topology, such as the distance from the central office to various subscribers as well as the presence of bridge taps. DSL database 140 is a repository for information regarding the transmission environment of the various types of DSL being transmitted over a given bundle of lines enabling the DSL management system to use previously developed information on the current DSL subscribers in managing the addition or deletion of additional subscribers. Operations Support System (OSS) 150 is the software currently used by the telecommunications service providers to support the operation of the telephone network and includes functions such as provisioning, billing, repair and customer service. The OSS 150 would rely on the DSL management system 100 to provide management of a plurality of DSL subscribers. The network operations center 160 is responsible for the operation of the physical network and can provide additional data on network topology to the DSL management system 100

Figure 2:
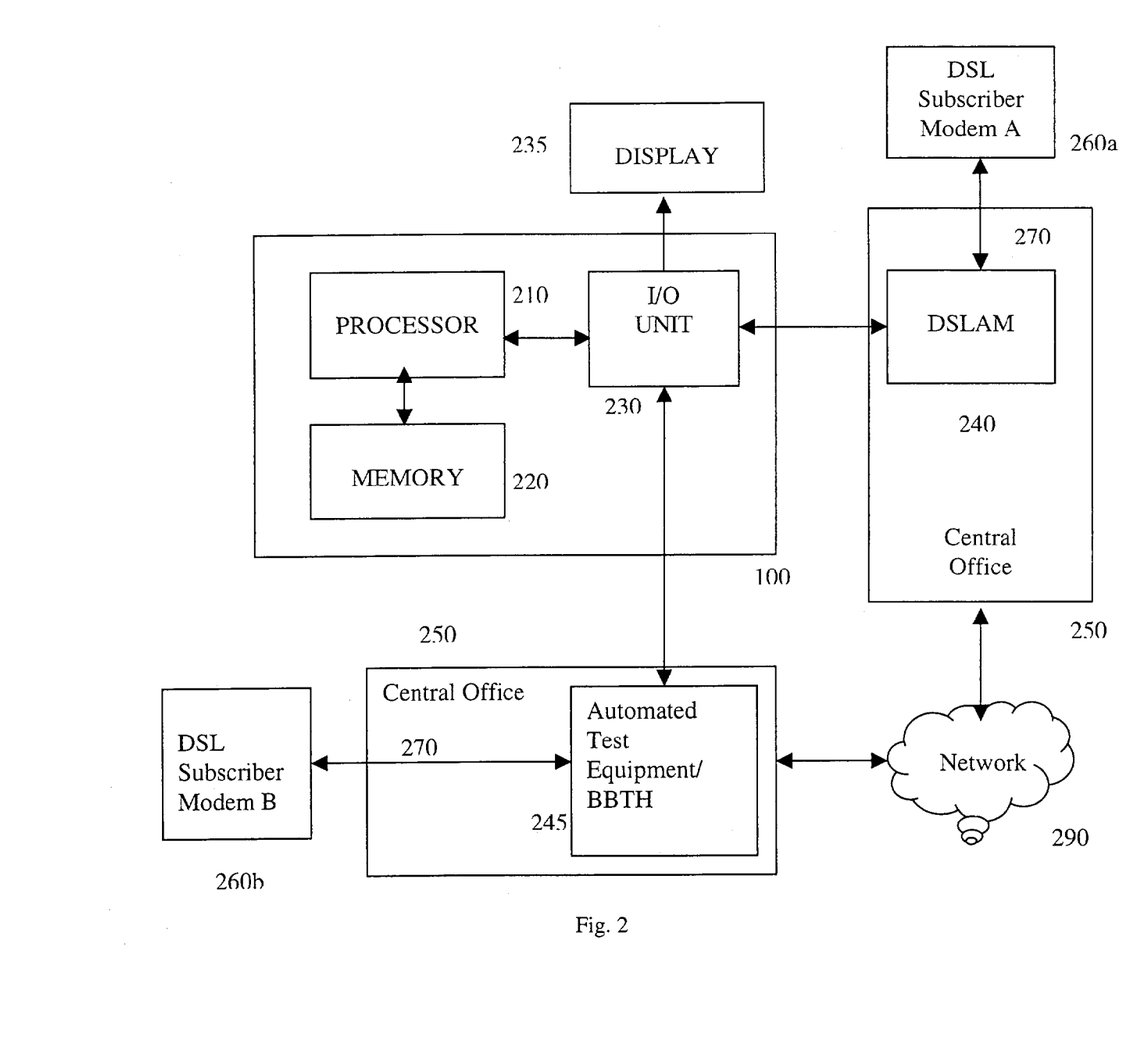
FIG. 2 depicts an illustrative embodiment of a DSL management system for implementing the methods of the present invention.

FIG. 2 provides a block diagram of a dynamic spectrum management system 100 in accordance with the present invention having a processor 210 in communication with a memory 220 (which can comprise either primary memory, such as RAM, or secondary memory, such as a magnetic disk drive or other storage media or a combination thereof) and input/output (I/O) unit 230. I/O unit 230 is adapted to receive data about the DSL loops 270 one of which extends from DSL subscriber modem A 260a to a central office 250, which then enables the DSL modem to communicate with a telecommunications network 290. DSL subscriber modem A 260a is connected to the central office through a digital subscriber line access multiplier (DSLAM) 240 housed in the central office (CO) 250 of the telephone network. This DSLAM 240 can also be used to send data about the loop 240.

Alternatively, DSL subscriber modem B 260b is connected to a central office 250 via a loop 270. Automated test equipment 110 such as a broadband test head (BBTH) 245 provides information to the I/O Unit 230 of DSL management system 100. Automated BBTH equipment 245 could be built in accordance with the teachings of commonly assigned U.S. patent application Ser. No. 09/587,459, entitled "Single Ended Measurement Method and System for Determining Subscriber Loop Make Up", U.S. patent application Ser. No. 09/676,881, entitled "Method for Determining Subscriber Loop Make-Up" and U.S. patent application Ser. No. 09/676,740, entitled "System and Circuitry for Measuring Echoes on Subscriber Loops" which are hereby incorporated by reference. The BBTH has the ability to identify the composition or make up of the loop 270 from the central office 250 to the remote DSL subscriber modem 260b and to provide information on the suitability of the loop 270 for DSL service.

The present invention relies on the ability to measure the electrical properties of individual loops 270. The BBTH 245 can access the loop 270 in the central office 250 through metallic test leads and can directly measure the loop response and the received noise. The BBTH could excite a pair of wires comprising a loop 270 with a signal and measure the received signal on another pair to measure the crosstalk coupling. Alternatively, the crosstalk coupling could be reconstructed from the received crosstalk. This is done by first estimating or determining from the records what the transmit PSD of the crosstalker is, and then using the combination of the estimated transmit PSD of the received crosstalk PSD to estimate the crosstalk coupling.

Such estimation can be done by the invention with a number of simultaneous crosstalkers. Crosstalk and received noise at the CO 250 end of the loop 270 is directly measured while crosstalk and received noise can be inferred by first estimating the types of crosstalkers at the CO 250 end.

The present invention may also rely on devices that measure the crosstalk at the receiver of an existing DSL modem. The purpose of a receiver is to estimate the transmit signal from a received signal plus noise, an in so doing it essentially estimates the received crosstalk noise at each sample. Moreover, a typical DSL system combines a number of DSL modems into a DSL access multiplexer (DSLAM) 240 at a central office, and the signal and received crosstalk noise is typically available as data such as bits and gain tables. Recent standards, such as the new ITU standard G.992.3, provide standardized interfaces for obtaining these measurements from DSL modems 260a or 260b or DSLAMs 240. Crosstalk and received noise at both ends of the loop can be measured directly by these devices.

Additional components of the system include various methods that are implemented in software stored in memory 220 and executed on processor 210. These include the software-implemented methods necessary to identify crosstalk as described in commonly assigned co-pending U.S. patent application Ser. No. 09/922,064, entitled "Crosstalk Identification for Spectrum Management in Broadband Telecommunications Systems" and U.S. patent application Ser. No. 10/209,547, entitled "Improved Crosstalk Identification For Spectrum Management in Broadband Telecommunications Systems" which are both hereby incorporated by reference.

Display 260 may be used to display graphical and/or textual information related to the operation of the PSD measurements and crosstalk identification. Other input/output devices (not shown) may be used in conjunction with the I/O unit 230 such as a keyboard, mouse, touch pad, trackball etc. in order to provide a user interface to the DSL management system 100 as necessary.

Processor 210 executes the method steps described herein as stored in memory 120 in order to identify the crosstalk on one or more subscriber lines 18. Additional software may also be executed to generate the PSD from the measurements input through I/O unit 130. Alternatively, a separate test measurement device capable of measuring the PSD for the various subscriber loops may be attached to I/O unit 230

Figure 3:
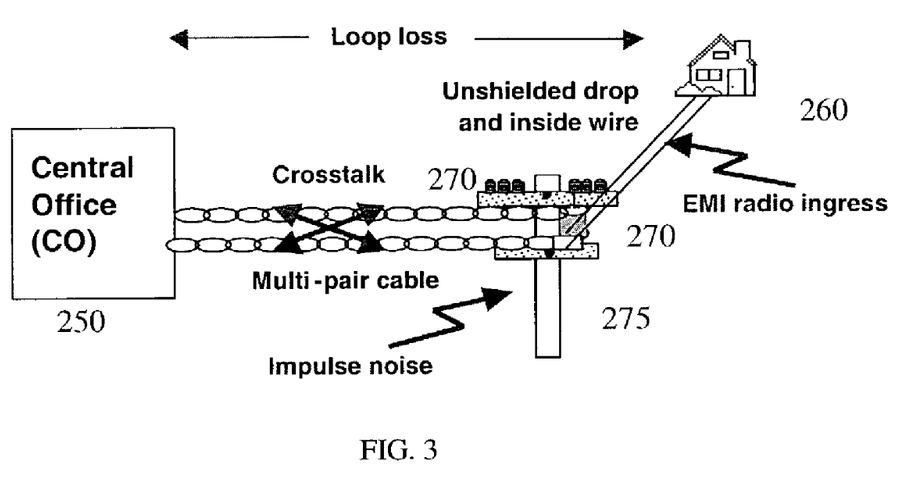
FIG. 3 is a schematic diagram of the central office to subscriber connection.

FIG. 3 illustrates certain DSL impairments that occur between a central office 250 and a subscriber 260 over loop 270, which is carried by one or more telephone poles 275 or, alternatively, is underground. The main impairments are loop and bridge tap loss, crosstalk, EMI radio ingress, impulse noise, and background noise. Although often overshadowed by crosstalk, measurements have found many locations with high enough levels of radio ingress or impulse noise to halt DSL service if not handled properly. Impulse noise can be measured by long term (~an hour or more) monitoring of raw bit errors. Background noise is typically low-level additive Gaussian noise.

Figure 4:
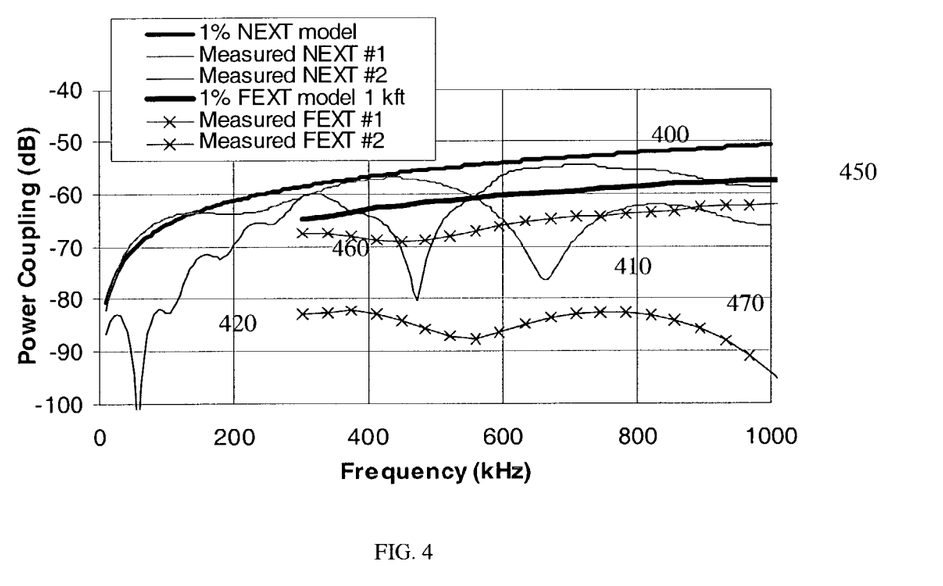
FIG. 4 is a graphical depiction of a one-percent worst-case single crosstalk disturber crosstalk power coupling models and measurements of pair-to-pair NEXT and FEXT.

The invention can operate in one of two modes: line-by-line (single line) mode and joint optimization mode. In line-by-line mode, the noise on a particular loop 270 is measured and analyzed by the DSL management system 100 to determine the loop composition, EMI noise, crosstalk sources and crosstalk couplings. The invention then uses this information to accurately provision, high-speed, reliable, and spectrally compatible DSL on this line or to troubleshoot this line. Single-disturber crosstalk is typically 10–20 dB better than the 1% worst-case model for it, and a binder filled with 24 or 49 crosstalkers is typically 3–6 dB better than the 1% worst-case model for it. Examples of actual pair-to-pair crosstalk couplings and 1% worst-case models are shown in FIG. 4. Curve 400 is the 1% worst-case model for NEXT with curve 410 representing the measured NEXT between two loops and curve 420 representing the measured NEXT between two additional loops. Curve 450 is the 1% worst-case model for FEXT with curve 460 representing the measured FEXT between two loops and curve 470 representing the measured FEXT between two additional loops. Thus, using actual measurements of crosstalk can enable the DSL management system 100 to increase throughput.

Figure 7:
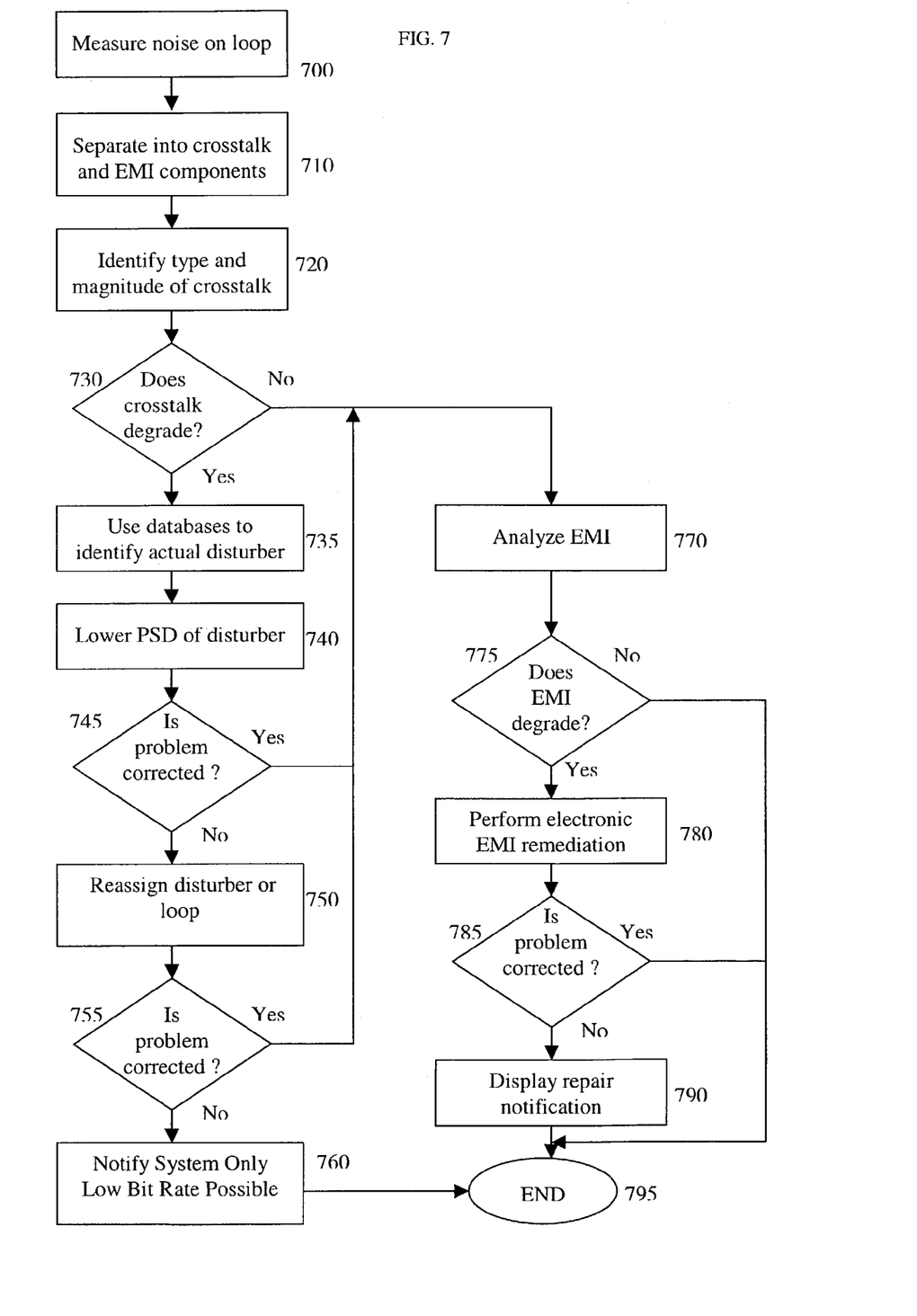
FIG. 7 is a flow diagram representing the data and decision flow in the single line optimization case; and, FIG. 8 is a flow diagram representing the data and decision flow in the joint optimization case.

The line-by-line method is depicted in FIG. 7. At step 700 the noise present on a loop 270 is measure and at step 710 the noise is separated into the crosstalk and EMI components.

The actual pair-to-pair crosstalk coupling should be determined. Although an average model could be used without serious degradation this is not the preferred embodiment of the present invention. The actual pair-to-pair crosstalk coupling can be reconstructed from the received crosstalk by first estimating the transmit PSD of the crosstalker, and then using the combination of the estimated transmit PSD and the received crosstalk PSD to estimate the crosstalk coupling. Let $D_i(f)$ be the crosstalk source signal transmitted on pair i, $H_{ik}(f)$ is the crosstalk coupling between pair i and pair k, and the crosstalk received on pair k from the system transmitting on pair i is $XT_{ik}(f)=H_{ik}(f)D_i(f)$. The received crosstalk is $XT_{ik}(f)$. Then, the crosstalk identification algorithms discussed above can be used at step 720 to identify the type of crosstalk source, and in doing so they estimate the transmit crosstalk source signal spectrum $\hat{D}_i(f)$. Note that $\hat{D}_i(f)$ is one of a few discrete possibilities among ISDN, HDSL, ADSL, etc., so it is quantized and therefore can be accurately estimated. The crosstalk coupling between pairs i and pair k can then simply be estimated by dividing $XT_{ik}(f)$ by $\hat{D}_i(f)$ as set forth in equation (1).

$$\hat{H}_{ik}(f)=XT_{ik}(f)/\hat{D}_i(f)=H_{ik}(f)D_i(f)\hat{D}$$

and if $\hat{D}_i(f)=D_i(f)$, then $\hat{H}_{ik}(f)=H_{ik}(f)$.

Crosstalk and received noise at the one end of a loop could be inferred by first estimating the types of crosstalkers at the other end. Given the estimated crosstalk couplings $\hat{H}_{ik}(f)$, the total received crosstalk PSD into a given DSL can be calculated simply as $$\sum_i D_i(f)\hat{H}_{ik}(f).$$

So, if the transmit spectra $D_i(f)$ are known and can be controlled, the crosstalk is known and can be controlled and optimized.

An alternative procedure for estimating crosstalk couplings is to use the knowledge of transmitted sequences (possibly training sequences) as well as the received crosstalk. Of course, pair-to-pair crosstalk couplings could also be measured by connecting test equipment to two pairs simultaneously.

A DSL may experience significant degradation because crosstalk couplings are too high or because another DSL is sending a power spectral density (PSD) that is too high. The process determines if the crosstalk is a problem at step 730. If crosstalk is not a significant problem then the system jumps to step 770 and analyzes the EMI noise. If crosstalk is a problem, the system then uses the identity of the type of DSL causing the crosstalk from step 720, and information from the DSL database 140 and/or the existing loop database 130 to determine the exact transmitter and pair that is causing the problems at step 735. The system will then either suggest or implement a solution by lowering the crosstalker's PSD at step 740. If that corrects the problem then the system can branch to step 770 to analyze EMI. If lowering the PSD of the identified crosstalk disturber does not fix the problem then the system will reassign the disturber or the line being optimized to another available loop at step 750. If this corrects the crosstalk problem then the system branches at step 755 to step 770 and analyzes the EMI. If the crosstalk problem cannot be corrected by lowering the PSD of the disturber or reassigning the disturber or the loop, then the system will notify the operator that the desired bit rate is not achievable at step 760. The operator may then attempt to further refinements by reiterating the process and restarting at step 730.

For example, when DSI #1 experiences a service outage, the invention determines what type of system generated the crosstalk that caused the outage. Then the spectrum management system identifies the crosstalker DSL #2 as one of this type of systems that recently turned on and lowers the transmitted PSD and/or bit rate of DSL #2 until DSL #1 can function normally.

At step 770 the EMI noise is analyzed and at step 775 a decision is made as to whether EMI is a problem. If the EMI is causing serious degradation in a DMT-type DSL system then electronic remediation consisting eliminating the use of some tones and of windowing the DMT signal could be used. EMI cancellation could also be implemented electronically by subtracting an estimate of the EMI from the received signal and noise. At step 785 the system determines if electronic EMI remediation was successful. If so, the process can end at step 795 with the data rate of the DSL loop optimized. If not, then the system displays a repair notification to the operator that the unshielded drop and/or inside wiring of the subscriber needs to be repaired or replaced by shielded cable. This will be recommended only if the system determines that signals transmitted over the measured loop and received only with background noise can achieve the desired performance. If only poor performance is possible then this can be noted rather than wasting effort trying to fix an unfixable situation.

Long-term monitoring by the DSL management system will also enable the identification of impulse noise that is often caused in the subscriber's home by the on off cycling of large appliances etc. Again, the system can attempt electronic remediation by increasing the forward error correction coding interleaver depth or can effect physical remediation by sending the operator a repair notification that the wire inside the subscriber home should be upgraded with additional shielding.

Although the main focus of the DSL management system is on optimizing data rates by reducing crosstalk and EMI, the system can also be expanded to take advantage of loop composition knowledge to identify the presence of bridge taps. The system may attempt electronic remediation of a bridge tap through the re-allocation of spectral power away from bridged tap nulls and/or may notify the system operator to send a repair crew to remove identified bridge taps that stand in the way of a customer receiving the desired DSL service.

A more involved process is to coordinate the many DSLs to provide joint optimality and spectral compatibility. The present invention measures and separates EMI from crosstalk noise, and then determines the loop response and crosstalk couplings. The crosstalk can then be managed by varying the transmit signals to achieve joint optimality, or at least an acceptable operating point, while attempting to minimize the measured EMI noise as set forth above.

The invention contains routines that automatically jointly optimize symmetric DSL and asymmetric DSL transmissions to achieve the highest overall throughput possible in a bundle (cable) of loops. This is calculated by the DSL management system 100 in an iterative fashion. DSL service on each loop in a bundle starts with some typical starting parameters. Next the transmit PSD of each DSL is optimized in round robin fashion. The crosstalk into a given DSL is the power sum of all transmissions passed through their measured crosstalk couplings. An asymmetric DSL has its transmit PSD optimized by using the "waterfilling" technique. A symmetric or single carrier DSL has its transmit PSD optimized simply as being the PSD corresponding to the maximum bit rate that it can reliably transmit. Then, the next DSL is optimized, then the next and so on back to the first DSL. After a few iterations through the loop the optimization converges rapidly. The present invention has revealed optimized bit rates that are roughly double those of current practice, on average.

The present invention can use the records and databases of loop and DSL parameters to augment its accuracy. The invention could record measurements of crosstalk at different time intervals and these measurements could be used to identify usage patterns of different DSLs over time and tailor the other DSLs to exploit periods of low crosstalk thereby allowing active users to transmit at higher bit rate when other users are inactive. The present invention can be used to identify either "bursting" or short-term stationary crosstalk.

In an illustrative embodiment, this inventive method and system of the present invention has been applied to optimizing the transmit spectra of single carrier DSL such as high-speed DSL (G.shdsl). The technique can apply to any single-carrier DSL, whose transmit PSD is uniquely determined by its transmitted bit rate and number of signal levels. G.shdsl is standardized by the ITU G.991.2 and ANSI T1.422 standards and the PSD of G.shdsl is defined in ANSI standard T1.417. G.shdsl currently transmits any symmetric bit rate up to 2320 kbps using 16-level trellis coded (TC) baseband pulse amplitude modulation (PAM) and higher bit rates are envisioned. The transmit PSD is uniquely determined by the bit rate and vice-versa.

The process for jointly optimizing a plurality of loops providing G.shdsl service is set forth below. The crosstalk couplings are all measured and are known. All G.shdsls start with any typical starting PSDs. Then the transmit PSD of each G.shdsl is optimized in round-robin fashion. The crosstalk into a given DSL is the power sum of all transmitted PSDs passed through their measured crosstalk couplings. The G.shdsl transmit PSD $SHDSL_T(f)$ is optimized simply as being the PSD corresponding to the maximum bit rate that it can reliably transmit, by using and modifying the formulas in T1.417. Then, the next G.shdsl is optimized, then the next and next, and back to the first DSL, until each DSL has been so optimized several times.

It has been found that this algorithm for symmetric DSL optimization converges rapidly to unique bit rates after each G.shdsl is optimized about 3 to 5 times. Using measured crosstalk couplings, the algorithm converged to the same bit rates no matter what the starting conditions for all cases tested (several thousand). However, using ANSI models of crosstalk power coupling, which are smooth curves, the algorithm occasionally did not converge.

The present invention can also be applied to the joint optimization of the transmit spectra of discrete multitone (DMT) modulated DSLs. DMT transmits a number of sub-carriers, typically spaced 4.3125 kHz apart called iterative waterfilling multitone modulation. Optimizing the spectrum is complicated because the amplitude of each tone can be varied, or turned off, producing a wide variety of possible transmit PSDs. The simulations presented below use ADSL, which is modulated with DMT, but the present techniques apply to any DMT DSL.

The nominal total average transmit power of downstream ADSL equals 20 dBm, and the nominal total average transmit power of upstream ADSL equals 12.5 dBm. These can be lowered.

Figure 5:
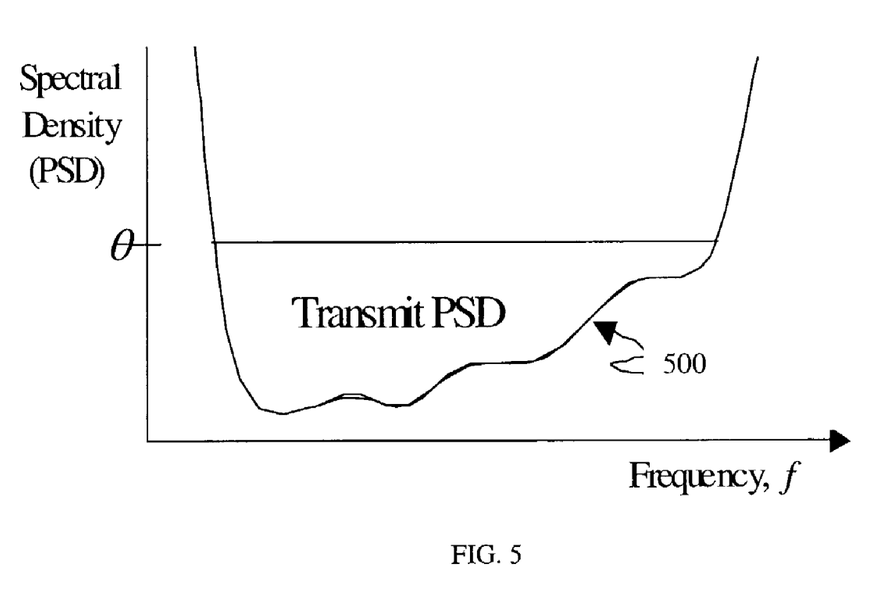
FIG. 5 is a graphical depiction of the waterfilling technique of the present invention.

DMT ADSL spectra are iteratively optimized similar to single-carrier spectra. The received crosstalk changes at each iteration for a particular ADSL, and the ADSL's transmit PSD is optimized. All ADSLs are optimized in turn, and then re-optimized, until each has been optimized several times and are no longer changing. At each iteration the transmit PSD of the ADSL is optimized by the "waterfilling" technique. Waterfilling can be envisioned as taking a frequency plot 500 of the power spectrum of the noise power divided by the power transfer function of the loop to represent a bowl, and then filling this "bowl" with transmit power that maintains a flat "water level", as illustrated in FIG. 5. The total transmit power equals a preset allowable total average transmit power. Mathematically, let $|N(f)|^2/|H(f)|^2$ be the noise power divided by the power transfer function of the loop. Then, assuming Gaussian noise, the transmit spectra that can achieve channel capacity is max $(0, \theta - |N(f)|^2/|H(f)|^2)$ where $\theta$ is a constant such that the desired total average transmit power is transmitted (see FIG. 5).

Iterative waterfilling requires that the ADSL transmit PSD be allowed to vary. Early versions of the ADSL standard did not allow more than 3.5 dB "passband ripple," so the transmit PSD had to be flat (within 3.5 dB) and iterative waterfilling was not possible. The ADSL2 G.992.3 standard allows the power of each tone to be adjusted separately, and so it now supports iterative waterfilling. Different ADSLs can each be assigned a different total allowed transmit power, and varying the vector of allowed transmit powers changes the vector of achievable rates, called the achievable capacity region. That is, given that each ADSL has a certain desired bit rate, the total transmit power of each ADSL can be adjusted to different values so that the set of achieved bit rates matches the desired bit rates as close as possible.

Figure 8:
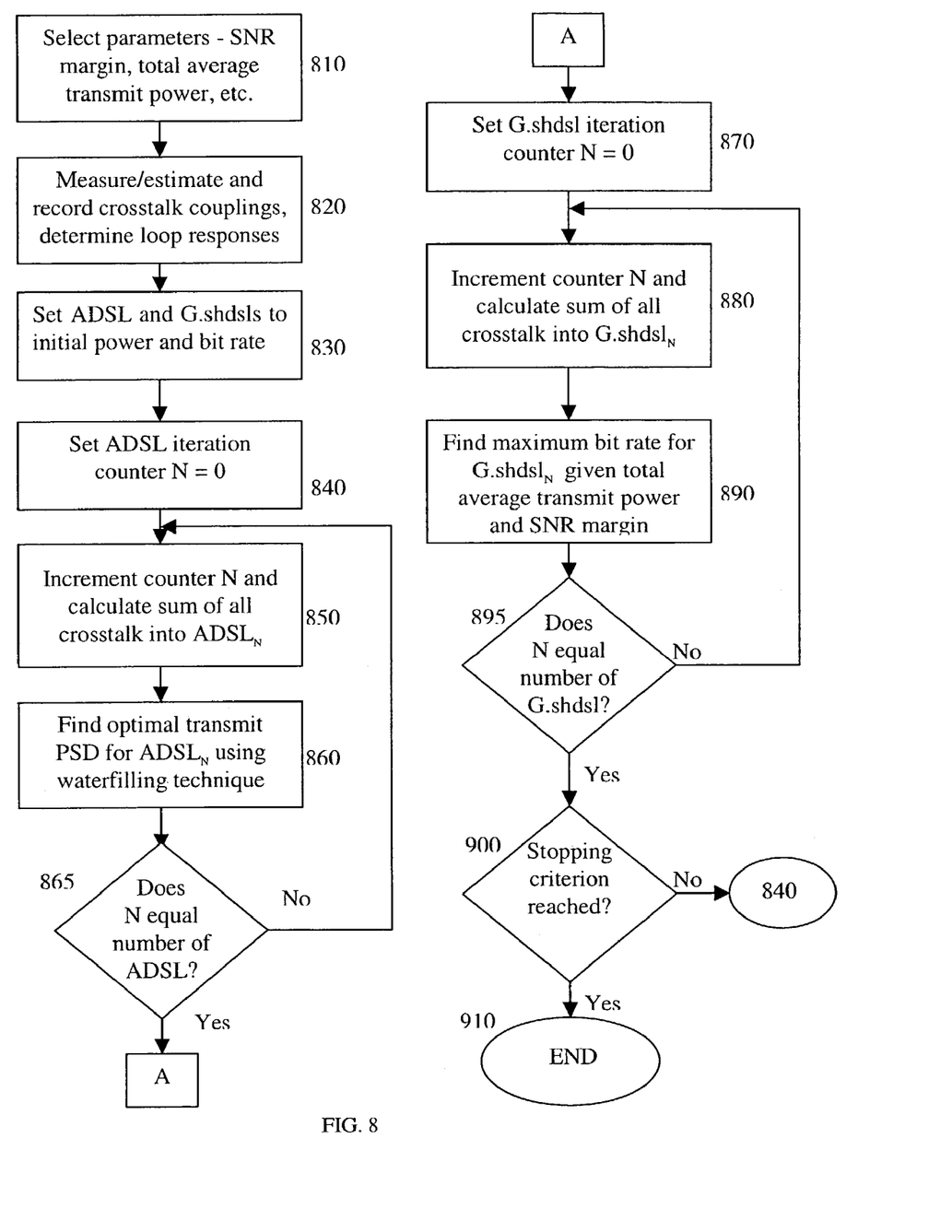

FIG. 8 depicts the flow of data and decisions to implement the joint optimization method of the present invention for joint optimization of single-carrier and multicarrier DSLs transmitting in the same cable binder. At the first step 810 of the process the desired signal-to-noise ratio (SNR) margin of each DSL line is chosen (it is typically 6 dB). The allowed total average transmit power of each DSL line is chosen. Other simulation parameters such as background noise levels, etc., are also chosen. The parameters chosen in step 810 do not change for the remainder of the optimization process.

At step 820, for every DSL in the same binder, the pair-to-pair crosstalk power couplings between all DSLs are measured, or estimated, and recorded. The loop make-up or loop responses that the DSLs transmit over are either measured or extracted from a database. The loop power transfer function $|H(f)|^2$ is readily computed if the loop make-up is known. Generally, loops in the same binder have similar length and gauge, so they can often be assumed to all have the same loop make-up with little error. The crosstalk between different binders is low and can be ignored.

At step 830 all ADSLs are initialized to transmit a flat PSD (the same power at every frequency), at their allowed average power and all G.shdsls are initialized to transmit a bit rate roughly equal to what they may achieve on the given loop at their allowed average power. Simulations have set the initial G.shdsl bit rate equal to twice the bit rate predicted by worst-case crosstalk models. The selected initial bit rates are not important except that more accurate selection may speed up convergence a little.

At step 840, the ADSL iteration counter is set to zero. This counter is used to loop through the N ADSL loops present in the binder. At step 850 the ADSL iteration counter, N, is incremented and the sum of all crosstalk into $ADSL_N$ is calculated given the initial transmit PSDs and crosstalk power couplings. This sum crosstalk noise PSD and the loop make-up are used to calculate $|N(f)|^2/|H(f)|^2$, and this is used to find the optimal waterfilled transmit PSD of $ADSL_N$ at step 860. The waterfilled PSD is found by adjusting the transmit power of each ADSL tone to transmit a PSD equal to max$(0, \theta - |N(f)|^2/|H(f)|^2)$, and iterating to find the constant $\theta$ such that the desired total ave power is transmitted.

Step 865 the process determines if steps 850 and 860 have been performed for all N ADSL in the binder. If not the process returns to step 850 for the second ADSL and so on. Once all the remaining ADSLs have their transmit PSDs similarly optimized by waterfilling the process branches to step 870 for optimization of the G.shdsl loops in the binder.

At step 870 the G.shdsl iteration counter is initialized. At step 880 the counter is incremented and, given the current transmit PSDs of all the DSLs and the crosstalk power couplings, the sum crosstalk from both ADSL and G.shdsl into $G.shdsl_N$ is calculated. At step 890 the maximum bit rate that can be transmitted by this $G.shdsl_N$ with its allowed total average transmit power and SNR margin is calculated. The first G.shdsl (N=1) is subsequently assumed to transmit the PSD corresponding to this maximum bit rate and allowed total average transmit power.

At step 895 the process determines if all N G.shdsl loops have been optimized and, if not, the process loops back to step 880 where the crosstalk into the next G.shdsl line is computed and its bit rate is maximized in the same way as the first G.shdsl was in steps 880 and 890. This process continues until G.shdsl iteration counter equals the number of G.shdsl loops in the binder.

The final step 900 determined is the stopping criterion has been reached. If it has been reached then the iterative optimization process has converged and the process is at an end 910. The optimized transmit PSD's and bit rates may now be implemented by the DSL management system 100. If the stopping criterion has not been reached, the process returns to step 840 computing the crosstalk assuming the most recently computed PSDs. Steps 850–890 are repeated until the stopping criterion is reached, i.e., none of the DSLs' computed bit rates vary between each repetition by more than some small amount (1 kbps in the simulations). These bit rates and the corresponding PSDs are then the final, jointly optimized, values.

Additionally, the algorithm above may be run multiple times with different values of total average transmit power assigned to each DSL, resulting in different sets of bit rates. The set of bit rates that best matches the desired bit rates can then be selected and achieved with its corresponding values of total average transmit power. Simulations have found that this algorithm converges rapidly to unique values after only about 3 to 6 iterations.

This algorithm can be implemented on actual DSL modems in service. The DSL management system 100 can be used to control the process and the DSL modems actually send their optimal PSDs. Only steps 850 and 880 change substantially in that instead of calculating the crosstalk it is simply received at the modems.

Simulations generally use standardized simulation parameters as defined in the ANSI Spectrum Management Standard, T1.417. The following modifications to the parameters in T1.417 were made in order to mimic actual individual ADSL lines:

ADSL DMT tone spacing is $f_{delta}=4.3125$ kHz, and tones 40 to 255 carry downstream signals. ADSL tones are not assumed to have ideal bandpass spectra, instead each tone has PSD equal to $(\sin(\pi(f-fc)T)/(\pi(f-fc)T))^2$, where the center frequency of the tone is fc and $1/T=8$ kHz, the DMT block rate.

Measured NEXT and FEXT couplings are used in the simulations. All sources of NEXT and FEXT from all upstream and downstream G.shdsls and ADSLs are summed to create received crosstalk. All DSLs transmit over the same loop make-up in the simulations here for simplicity, but this is not necessary.

FEXT measurements are at each of 401 frequency points from 100 kHz to 2 MHz. 300 distinct pair-to-pair FEXT couplings were measured with different pair combinations on a 25 pair, 24 gauge, outside plant aircore PIC cable 899 ft long. These are adjusted to the particular loop that is simulated using the ANSI model for FEXT as a function of loop length and response [1] by adding to them, in dB, $10\log_{10}(1/899)+10\log_{10}(|H(f)|^2/|H_{FEXT}(f)|^2)$, where 1 is the loop le power transfer function of the loop, and $H_{FEXT}(f)|^2$ is the power transfer function of the 899 ft 24 gauge cable that the FEXT was measured on.

NEXT measurements are at each of 401 frequency points from 10 kHz to 2 MHz. 1200 distinct pair-to-pair NEXT couplings were measured with different pair combinations on 4 different 25 pair cables. One cable is a 24 gauge outside plant air-core PIC cable 899 ft long, another cable is 1000 ft 26 gauge air-core PIC, another cable is 5000 ft 24 gauge PIC, and another cable is 1010 ft 26 gauge PIC.

FEXT is often low power, so to include its effects the simulations use the 100 distinct highest-power FEXT couplings out of the 300 measured, and for some simulations the FEXT couplings were increased by 10.0 dB. All 1200 distinct measured pair-to-pair NEXT couplings are used. The simulations randomly pick different NEXT and FEXT couplings between each of all the DSLs before each time the joint optimization algorithm is run. The frequency spacing for evaluating G.shdsl is 100 Hz, and for evaluating ADSL the frequency spacing is 4.3125 kHz. Measured NEXT and FEXT is linearly interpolated in dB to the evaluation frequency spacings.

Some simulations have power back off (PBO) applied to some of the DSLs. Full-power ADSL transmits 20 dBm total average power downstream. Full-power G.shdsl transmits 13.5 dBm total average power downstream. The total average power is reduced by the PBO below these numbers, if there is PBO. The SNR margin is 6 dB. When waterfilling the PSD of ADSL, the parameter θ is iteratively adjusted until the average power is within 0.1 dB of the desired average power. Iterations are performed until the bit rate of each DSL changes by no more than 1 kbps.

Results are only for downstream signals, for simplicity, and because the downstream ADSL signal is at higher frequencies than upstream so it creates and receives more crosstalk than upstream. Upstream ADSL simply uses the fixed spectra defined in T1.417. Reference bit rates are computed with the 1% worst-case crosstalk ANSI couplings with the same numbers and types of crosstalk disturbers as the simulation, and with no PBO. The reference G.shdsl bit rates are computed first, then the reference ADSL bit rates are computed with crosstalk from G.shdsl at the reference bit rates. There is no power back off (PBO) when computing reference bit rates. The optimized G.shdsl bit rates often reach their maximum of 2320 kbps and show little change as some parameters change because of this.

Tables 1–8 present downstream bit rates achieved by the joint optimization algorithm with ADSLs and G.shdsls in the same binder. For each table, the algorithm was run 600 different times with different randomly chosen pair-to-pair NEXT and FEXT couplings, and statistics on the percent increases in bit rate relative to the reference bit rates are presented. Minimum and maximum bit rates are across all the different ADSLs or G.shdsl and all 600 different crosstalk couplings. Reference bit rates have no PBO, so results with PBO have that much more dB increase in performance over the reference. Some tables show a minimum percent increase for ADSL that is negative, meaning the bit rate declined for at least one of the ADSLs in one of the 600 cases of crosstalk couplings. These cases represent ADSL lines that would fail to operate in the field without the measurements assumed here. Table. 1 shows that the bit rate increases using the joint optimization algorithm on a 15 kft 26-gauge loop, with 4 full-power ADSLs and 4 full-power G.shdsls in the same binder. Measured FEXT couplings were increased by 10 dB.

TABLE 1

| Bit rate statistic | ADSL | G.shdsl |
|---|---|---|
| Reference bit rate (kbps) | 11386.4 | 592 |
| Average percent increase | 43.18% | 268.69% |
| Maximum percent increase | 74.43% | 291.89% |
| Minimum percent increase | −36.58% | 111.32% |

Table 2 shows that the bit rate increases using the joint optimization algorithm on a 17 kft 26 gauge loop, with 5 full-power ADSLs and 5 full-power G.shdsls in the same binder. No increase in FEXT couplings.

TABLE 2

| Bit rate statistic | ADSL | G.shdsl |
|---|---|---|
| Reference bit rate (kbps) | 1972.76 | 661 |
| Average percent increase | 29.76% | 246.99% |
| Maximum percent increase | 55.01% | 250.98% |
| Minimum percent increase | −31.94% | 151.89% |

Table 3 shows that the bit rate increases using the joint optimization algorithm on a 14 kft 26 gauge loop, with 5 full-power ADSLs and 5 full-power G.shdsls in the same binder. No increase in FEXT couplings.

TABLE 3

| Bit rate statistic | ADSL | G.shdsl |
| --- | --- | --- |
| Reference bit rate (kbps) | 494.6 | 433 |
| Average percent increase | 165.4% | 253.61% |
| Maximum percent increase | 227.61% | 418.01% |
| Minimum percent increase | 36.46% | 71.59% |

Table 4 shows that the bit rate increases using the joint optimization algorithm on a 16 kft 26 gauge loop, with 6 full-power ADSLs and 2 full-power G.shdsls in the same binder. No increase in FEXT couplings.

TABLE 4

| Bit rate statistic | ADSL | G.shdsl |
| --- | --- | --- |
| Reference bit rate (kbps) | 842.4 | 541 |
| Average percent increase | 105.35% | 300.23% |
| Maximum percent increase | 141.22% | 328.84% |
| Minimum percent increase | −21.28% | 85.03% |

Table 5 shows that the bit rate increases using the joint optimization algorithm on a 12 kft 26 gauge loop, with 3 full-power ADSLs and 5 full-power G.shdsls in the same binder. No increase in FEXT couplings.

TABLE 5

| Bit rate statistic | ADSL | G.shdsl |
| --- | --- | --- |
| Reference bit rate (kbps) | 3428.88 | 1003 |
| Average percent increase | 18.91% | 131.31% |
| Maximum percent increase | 32.66% | 131.31% |
| Minimum percent increase | −14.07% | 131.31% |

Table 6 shows that the bit rate increases using the joint optimization algorithm on a 17 kft 26 gauge loop, with 3 full-power ADSLs and 5 full-power G.shdsls in the same binder. No increase in FEXT couplings.

TABLE 6

| Bit rate statistic | ADSL | G.shdsl |
| --- | --- | --- |
| Reference bit rate (kbps) | 543.5 | 441 |
| Average percent increase | 137.24% | 271.24% |
| Maximum percent increase | 192.25% | 417.01% |
| Minimum percent increase | 19.94% | 76.64% |

G.shdsl bit rates often increase more than ADSL bit rates. This is because G.shdsl bandwidth is proportional to the bit rate. Some DSL lines may need to provide higher or lower bit rates or service levels than others. These problems can by handled by varying the overall transmit power of each DSL line. A few cases of apply power back off (PBO) to some DSLs and not to others were simulated to see how this affects the jointly optimized bit rates.

Table 7 shows that bit rate increases using the joint optimization algorithm on a 15 kft 26 gauge loop, with 2 full-power ADSLs, 2 ADSLs with 10 dB PBO, 2 full-power G.shdsls, and 2 G.shdsls with 20 dB PBO in the same binder. Measured FEXT couplings were increased by 10 dB.

TABLE 7

| Bit rate statistic | ADSL 10 dB PBO | ADSL No PBO | G.shdsl 20 dB PBO | G.shdsl No PBO |
| --- | --- | --- | --- | --- |
| Reference bit rate (kbps) | 1386.4 | 1386.4 | 592 | 592 |
| Average percent increase | −20.34% | 60.2% | 281.87% | 287.57% |
| Maximum percent increase | 1.87% | 82.65% | 291.89% | 291.89% |
| Minimum percent increase | −79.42% | −34.28% | 136.99% | 152.03% |

Table 8 shows that bit rate increases using the joint optimization algorithm on a 18 kft 26 gauge loop, with 1 full-power ADSLs, 2 ADSLs with 5 dB PBO, 1 full-power G.shdsl, and 2 G.shdsls with 10 dB PBO in the same binder with no increase in FEXT couplings.

TABLE 8

| Bit rate statistic | ADSL 10 dB PBO | ADSL No PBO | G.shdsl 20 dB PBO | G.shdsl No PBO |
| --- | --- | --- | --- | --- |
| Reference bit rate (kbps) | 258.21 | 258.21 | 417 | 417 |
| Average percent increase | 199.1% | 351.11% | 309.03% | 341.09% |
| Maximum percent increase | 263.43% | 390.75% | 394.96% | 406% |
| Minimum percent increase | −29.48% | 177.37% | 97.12% | 150.12% |

Spectral optimization can also be very useful for cases where some DSLs are deployed from a central office (CO), and some DSLs are deployed from a remote terminal (RT). Then, the power transmitted by the RT-based DSL can be lowered by as much as 50 dB or so, and optimizing the spectra can greatly increase the performance of the CO-based DSL.

Loop information should be stored in a database so that repeating troubles can be easily identified and fixed the next time they occur. Some infrastructure is needed for advanced DSL management, as shown in FIG. 1. Data may be collected by automated test equipment 110 in the central office (CO), or extracted from DSL modems and DSL access multiplexers (DSLAMs) 120. There should be communications paths from the DSLAMs to the DSL management system 100 that has access to the existing loop database 130 and DSL database 140 and that provides the analysis engine, as well as communications with existing operations support systems 150. The DSL database 140 will need to be populated and maintained. There is a cost for this. However, it can be shared over the many lines in a CO, and it should be considerably less costly than a brute-force manual upgrade of the outside plant. Adding communications and knitting it together with intelligent algorithms and control creates a management system is a "force multiplier," leveraging the existing copper loop plant and outside plant maintenance craft forces to obtain precise control over facilities and services.

Figure 6:
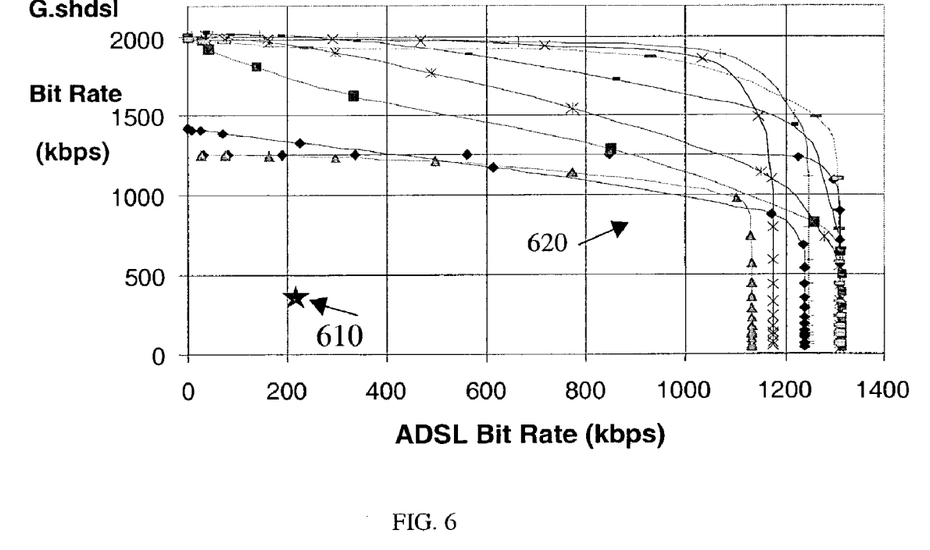
FIG. 6 is a graphical comparison of managed and worst-case downstream ADSL and G.shdsl bit rates as ADSL and G.shdsl transmit power varies.

Rather than always assume worst-case crosstalk, the DSL management system 100 is tailored to the crosstalk couplings and crosstalk sources in an individual cable binder, allowing DSL to provide the highest possible service rates while ensuring spectral compatibility. Loops that are identified to have low crosstalk coupling may carry higher bit rates than the worst-case. Also, many DSLs can lower their transmit power substantially without degrading their own quality of service, lowering the crosstalk into other DSLs and allowing higher service levels for them. This leads to an overall joint optimization of multiple DSL transmit spectra, which lowers crosstalk and can typically increase bit rates by a factor of two or three on long loops with existing DSLs, or on shorter loops using wider bandwidths. A sample of results using the DSL management system 100 is shown in FIG. 6. Here the spectra were iteratively optimized jointly for many different transmit power levels of 4 G.shdsl and 4 ADSLs using measured crosstalk in the same cable binder. The reference bit rates with 1% worst-case crosstalk were 397 kbps for G.shdsl, and 230 kbps for downstream ADSL. Data point 610 is the worst-case crosstalk coupling at full transmit power and data curve sets 620 show the different measured crosstalk couplings that can be achieved using the iterative optimization methods of the present invention.

The above description has been presented only to illustrate and describe the invention. It is not intended to be exhaustive or to limit the invention to any precise form disclosed. Many modifications and variations are possible in light of the above teaching. For example, the teachings may be applied to other types of DSL systems. The applications described were chosen and described in order to best explain the principles of the invention and its practical application to enable others skilled in the art to best utilize the invention on various applications and with various modifications as are suited to the particular use contemplated.

What is claimed is:

1. A method for the automated management of a plurality of digital subscriber lines in a telecommunication network capable of providing broadband data transmission between a central office and one or more subscribers using symmetric and asymmetric transmission comprising the steps of:
    selecting an allowed total average transmit power and signal-to-noise ratio margin for each digital subscriber line;
    measuring or estimating the crosstalk couplings between digital subscriber lines;
    determining the loop response function for each digital subscriber line;
    setting the initial transmit power and bit rates for each digital subscriber line;
    calculating the sum of all crosstalk into and finding the optimal transmit power for each asymmetric digital subscriber line;
    calculating the sum of all crosstalk into and finding the maximum bit rate for each symmetric digital subscriber line; and,
    iteratively performing the calculating steps until a predetermined stopping criterion is reached.

2. The method of claim 1 wherein the step of finding the optimal transmit power for each asymmetric digital subscriber line uses the waterfilling technique.

3. The method of claim 1 wherein the predetermined stopping criterion is based on the difference in the maximum bit rates for each digital subscriber line from one iteration to the next.

4. The method of claim 3 wherein the predetermined stopping criterion is when the difference in the maximum bit rates for each digital subscriber line from one iteration to the next is approximately 1 kbps.

5. The method of claim 1 wherein the step of determining the loop response function for each digital subscriber lines further comprises retrieving information from the existing loop database.

6. The method of claim 1 wherein the initial transmit power for each asymmetric digital subscriber line is set to a flat power spectral density across every frequency of transmission at the allowed average power.

7. The method of claim 1 wherein the initial bit rate for each symmetric digital subscriber line is set to approximately twice the bit rate predicted by the worst-case crosstalk model.

8. The method of claim 1 wherein the signal-to-noise ration margin is selected to be approximately 6 dB.

9. A system for the automated management of a plurality of digital subscriber lines in a telecommunication network capable of providing broadband data transmission between a central office and one or more subscribers using symmetric and asymmetric transmission comprising:
    means for selecting an allowed total average transmit power and signal-to-noise ratio margin for each digital subscriber line;
    means for measuring or estimating the crosstalk couplings between digital subscriber lines;
    means for determining the loop response function for each digital subscriber line;
    means for setting the initial transmit power and bit rates for each digital subscriber line;
    means for iteratively calculating the sum of all crosstalk into and for finding the optimal transmit power for each asymmetric digital subscriber line until a predetermined stopping criterion is reached; and,
    means for iteratively calculating the sum of all crosstalk into and for finding the maximum bit rate for each symmetric digital subscriber line until a predetermined stopping criterion is reached.

10. The system of claim 9 wherein the means for finding the optimal transmit power for each asymmetric digital subscriber line uses the waterfilling technique.

11. The system of claim 9 further comprising a means for communicating with automated test equipment capable of determining the composition of one or more digital subscriber lines.

12. The system of claim 9 further comprising a means for communicating with an existing loop database to provide information regarding the composition of one or more digital subscriber lines.

13. The system of claim 9 further comprising a means for communicating with the operations support system.

14. The system of claim 9 wherein at least one of the means for iteratively calculating resides in the subscriber modem.

15. A system for the management of one or more digital subscriber lines for providing communications services from a central office to a subscriber modem comprising:
    means for measuring noise on a first digital subscriber line;
    means for separating the measured noise into a crosstalk component and an electromagnetic interference (EMI) component;
    means for identifying the type of disturber causing the crosstalk component;
    means for identifying the identity of the actual crosstalk disturber;
    means for communicating with the crosstalk disturber in order to lower the power spectral density of the disturber; and,
    means for reassigning the crosstalk disturber in order to reduce crosstalk on the first digital subscriber line.

16. The system of claim 15 further comprising:
    means for analyzing the EMI component of the noise;
    means for performing electronic EMI remediation.

17. The system of claim 16 wherein the means for performing electronic EMI remediation comprises EMI cancellation.

18. The system of claim 16 further comprising a means for displaying a notification for repair to the unshielded components of the digital subscriber line loop.

19. A method for the management of digital subscriber lines used to provide DSL service comprising the steps of:
  measuring the noise on a first digital subscriber line;
  separating the noise into a crosstalk component and an EMI component;
  identifying the type of crosstalk disturber causing the crosstalk component of the noise;
  determining if the crosstalk component of the noise degrades the DSL service on the first digital subscriber line; and,
  if the DSL service is degraded by the crosstalk component of the noise, identifying the identity of the crosstalk disturber; and,
  lowering the transmit power of the crosstalk disturber so as to reduce the crosstalk component of the noise.

20. The method of claim 19 further comprising the step of reassigning the crosstalk disturber to a different digital subscriber line if the lowering of transmit power does not reduce the crosstalk component of the noise sufficiently.

21. The method of claim 19 further comprising the steps of:
  determining if the EMI component of the noise degrades the DSL service on the first digital subscriber line;
  if the EMI component degrades the DSL service, reducing the EMI component of the noise through EMI cancellation.

22. The method of claim 21 further comprising the step of communicating a repair notification if the EMI cancellation does not reduce the EMI component of the noise sufficiently.

* * * * *